(12) United States Patent
Hirai

(10) Patent No.: US 8,508,625 B2
(45) Date of Patent: Aug. 13, 2013

(54) IMAGE PROCESSING APPARATUS

(75) Inventor: Shinya Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 12/958,221

(22) Filed: Dec. 1, 2010

(65) Prior Publication Data
US 2011/0134292 A1 Jun. 9, 2011

(30) Foreign Application Priority Data

Dec. 4, 2009 (WO) .................. PCT/JP2009/070384

(51) Int. Cl.
*H04N 9/68* (2006.01)
*H04N 5/228* (2006.01)

(52) U.S. Cl.
USPC .................. 348/234; 348/222.1; 348/235

(58) Field of Classification Search
USPC .................. 348/235
See application file for complete search history.

(56) References Cited

U.S. PATENT DOCUMENTS

| | | | |
|---|---|---|---|
| 6,816,193 B1 | 11/2004 | Kohashi | |
| 7,065,246 B2 * | 6/2006 | Xiaomang et al. | 382/162 |
| 7,859,589 B2 * | 12/2010 | Yabe | 348/364 |
| 2005/0249404 A1 * | 11/2005 | Xiaomang | 382/162 |
| 2007/0109423 A1 | 5/2007 | Kohashi | |
| 2007/0109424 A1 | 5/2007 | Kohashi | |
| 2007/0132858 A1 * | 6/2007 | Chiba et al. | 348/222.1 |
| 2008/0122953 A1 * | 5/2008 | Wakahara et al. | 348/241 |
| 2008/0143881 A1 * | 6/2008 | Tsukioka | 348/631 |
| 2009/0086062 A1 * | 4/2009 | Tsuruoka | 348/241 |
| 2009/0208129 A1 | 8/2009 | Shimodaira | |
| 2011/0211126 A9 * | 9/2011 | Tsukioka | 348/631 |

FOREIGN PATENT DOCUMENTS

| | | |
|---|---|---|
| JP | 2001-128186 A | 5/2001 |
| JP | 2003-348609 A | 12/2003 |
| JP | 2008-015741 A | 1/2008 |
| JP | 2008-72377 A | 3/2008 |
| JP | 2009-199104 A | 9/2009 |

* cited by examiner

*Primary Examiner* — Lin Ye
*Assistant Examiner* — John H Morehead, III
(74) *Attorney, Agent, or Firm* — Carter, DeLuca, Farrell & Schmidt LLP

(57) ABSTRACT

A processing circuit which generates a plurality of signals of different frequency bands from a signal and which suppresses noise by synthesizing the signals of different frequency bands and a generation circuit which generates a signal in which an aliasing signal is suppressed are provided. A signal of the highest frequency band among the signals of different frequency bands to be synthesized with one another by the processing circuit includes the signal which is generated by the generation circuit and in which generation of aliasing signals is suppressed.

18 Claims, 12 Drawing Sheets

| R | G1 | R | G1 | R | G1 | R | G1 | R | G1 | R | G1 |
| G2 | B | G2 | B | G2 | B | G2 | B | G2 | B | G2 | B |
| R | G1 | R | G1 | R | G1 | R | G1 | R | G1 | R | G1 |
| G2 | B | G2 | B | G2 | B | G2 | B | G2 | B | G2 | B |
| R | G1 | R | G1 | R | G1 | R | G1 | R | G1 | R | G1 |
| G2 | B | G2 | B | G2 | B | G2 | B | G2 | B | G2 | B |
| R | G1 | R | G1 | R | G1 | R | G1 | R | G1 | R | G1 |
| G2 | B | G2 | B | G2 | B | G2 | B | G2 | B | G2 | B |
| R | G1 | R | G1 | R | G1 | R | G1 | R | G1 | R | G1 |
| G2 | B | G2 | B | G2 | B | G2 | B | G2 | B | G2 | B |
| R | G1 | R | G1 | R | G1 | R | G1 | R | G1 | R | G1 |
| G2 | B | G2 | B | G2 | B | G2 | B | G2 | B | G2 | B |

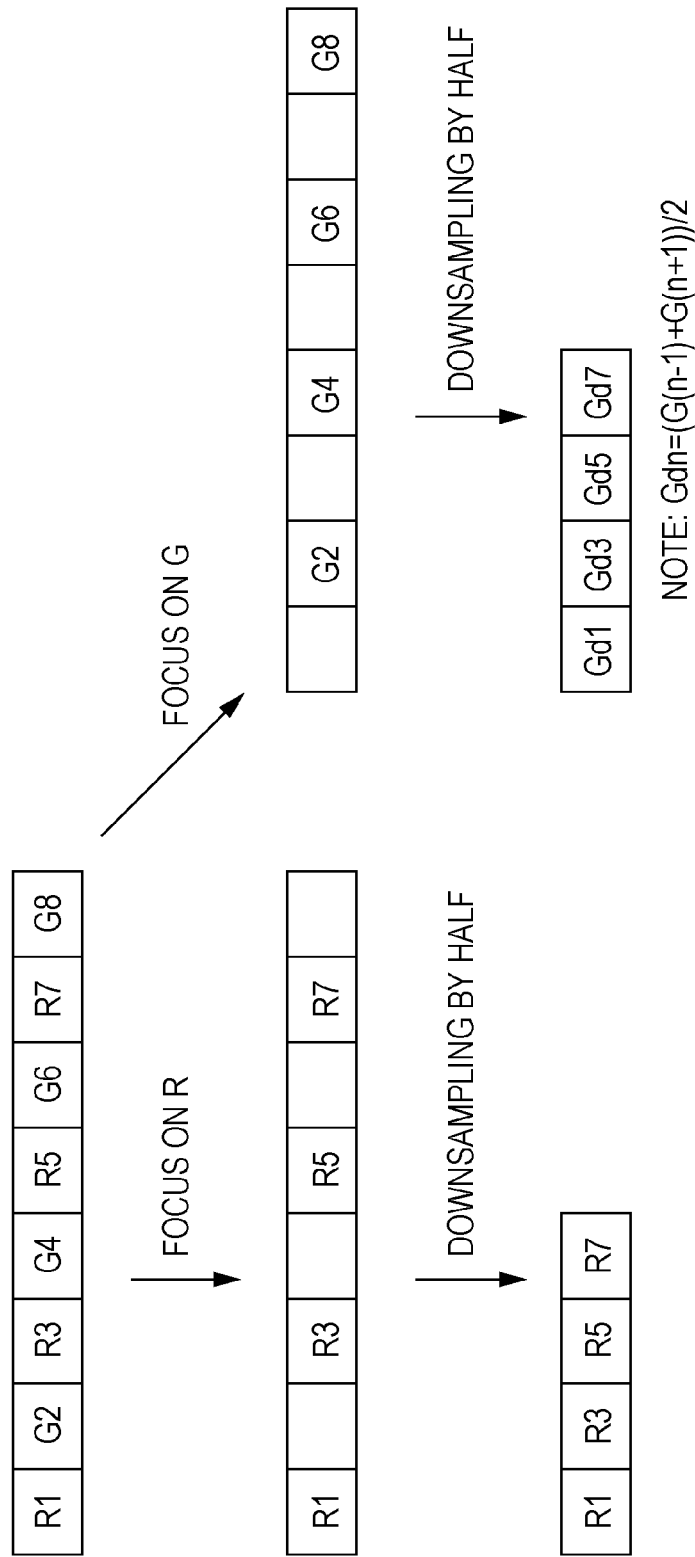

IMAGE PROCESSING APPARATUS

TECHNICAL FIELD

The present invention relates to image processing performed to suppress generation of an aliasing signal generated in image signals.

BACKGROUND ART

Image pickup elements such as CCD sensors and CMOS sensors include various types of color filter. A typical example such a color filter includes a color filter having a combination of primary colors (red, green, and blue) or complementary colors (cyan, magenta, and yellow).

FIG. 13 is a diagram illustrating primary-color Bayer arrangement of an image pickup element. In a matrix including four pixels, a pixel corresponding to red (R) and a pixel corresponding to blue (B) are diagonally arranged and pixels corresponding to green (G1 and G2) are arranged in the remaining two pixels. This arrangement pattern is repeated.

When an object includes a high-frequency component which exceeds resolution capability of the image pickup element, an aliasing signal is generated in an image signal generated by the image pickup element due to influence of the high-frequency component. Therefore, various methods for suppressing generation of an aliasing signal have been proposed.

For example, in order to suppress generation of an aliasing signal, a method for generating a luminance signal only using signals corresponding to G (G1 and G2) pixels without using signals corresponding R and B pixels in the primary-color Bayer arrangement shown in FIG. 13 has been proposed.

First, among signals corresponding to R, G, and B pixels obtained by digitalizing signals output from the primary-color Bayer arrangement of the image pickup element, values of signals other than signals corresponding to the G pixels are determined to 0. Next, vertical low-pass filter (V-LPF) processing is performed to limit a frequency band in a vertical direction and horizontal low-pass filter (H-LPF) processing is performed to limit a frequency band in a horizontal direction. By this, signals which have been compensated for using the signals corresponding to the G pixels are generated in the pixels, and a luminance signal corresponding to the G pixels is obtained. Hereinafter, a signal obtained through this method is referred to as a "first luminance signal".

Alternatively, values of signals other than signals corresponding to the R pixels may be determined to 0 and the V-LPF processing and the H-LPF processing may be similarly performed so as to generate a luminance signal corresponding to the R pixels. Furthermore, values of signals other than signals corresponding to the B pixels may be determined to 0 and the V-LPF processing and the H-LPF processing may be similarly performed so as to generate a luminance signal corresponding to the B pixels. Then, the R luminance signal and the B luminance signal may be added to the G luminance signal and a resultant signal may be determined as a first luminance signal.

Moreover, in order to suppress generation of an aliasing signal, a method for generating a luminance signal using all color signals included in the primary-color Bayer arrangement shown in FIG. 13 has been proposed.

The V-LPF processing which limits the frequency band in the vertical direction and the H-LPF processing which limits the frequency band in the horizontal direction are performed using the signals corresponding to the pixels of all colors i.e., the signals corresponding to the R, G, and B pixels obtained by digitalizing signals output from the image pickup element having the primary-color Bayer arrangement while colors of the signals are not distinguished from one another. In this way, a signal is newly obtained. Hereinafter, the signal obtained through this method will be referred to as a "second luminance signal".

FIG. 14 is a diagram illustrating characteristics of a spatial frequency in which the first and second luminance signals can be resolved.

An x axis represents a frequency space in a horizontal (H) direction and a y axis represents a frequency space in a vertical (V) direction. The farther a position from the original is, the higher the spatial frequency is.

A limit of resolution of the first luminance signal generated only using the signals corresponding to the G pixels in the horizontal and vertical directions is equal to Nyquist frequency ($\pi/2$) of arrangement of the G pixels. However, since lines which do not include a G pixel exist in an oblique direction, a limit resolution frequency in the oblique direction is lower than those in the horizontal and vertical directions. Accordingly, a region 1501 of a diamond shape shown in FIG. 14 corresponds to a resolution-available spatial frequency.

This is true for a case where the first luminance signal is generated by synthesizing R, G, and B luminance signals since the G luminance signal generated only using the signals corresponding to the G pixels has the highest resolution among the R, G, and B luminance signals.

On the other hand, since the second luminance signal is generated using the signals corresponding to the pixels of all the colors, when an object is achromatic, a square region 1502 shown in FIG. 14 corresponds to a resolution-available spatial frequency. Unlike the first luminance signal, since all lines have color pixels also in the oblique direction, a resolution-available spatial frequency in the oblique direction is higher than that of the first luminance signal. However, when the object is read, for example, signals output from pixels other than the R pixels are negligible, and therefore, only resolution in a region 1503 is obtained which is a quarter of resolution obtained in the case of an achromatic object.

In order to suppress generation of an aliasing signal included in an image signal, a method for generating a luminance signal taking characteristic of such first and second luminance signals into consideration has been proposed.

For example, a method for generating a luminance signal by changing a mixing ratio of the first luminance signal to the second luminance signal depending on a determination as to whether an object is a black-and-white object or a colored object has been proposed (refer to Japanese Patent Laid-Open No. 2003-348609).

Furthermore, a method for generating a luminance signal by changing a mixing ratio of the first luminance signal to the second luminance signal depending on a determination as to whether an object has the high correlation in the oblique direction as shown in FIG. 14 has been proposed (refer to Japanese Patent Laid-Open No. 2008-072377).

However, although these methods have advantages in terms of suppression of generation of an aliasing signal, other noise signals are not suppressed.

For example, in recent years, pixels of image pickup elements have been miniaturized. Therefore, in some cases, noise is increased due to the miniaturized pixels. Although various methods for suppressing generation of the noise by performing signal processing have been proposed, a fact that the suppression of generation of noise causes blur of images is widely known.

To avoid this situation, a method for suppressing generation of noise by dividing an image signal into a plurality of frequency components has been known (refer to Japanese Patent Laid-Open No. 2008-015741). Furthermore, a method for generating size-reduced image signal and synthesizing the size-reduced image signal and an original signal with each other so as to suppress generation of noise has known (refer to Japanese Patent Laid-Open No. 2009-199104).

For example, size-reduction processing is performed on an input image signal so that a minified image including frequency components lower than those of an input image is generated. Then, an edge intensity is detected from a minified image signal having the low frequency components, and a region in which an edge component is to be held is obtained in accordance with the edge intensity. Thereafter, an original image signal and the minified image signal having the low frequency components are synthesized with each other while various weights are applied to regions so that an image included in the region in which the edge component is to be held is not blurred whereby another image signal is generated.

However, an aliasing signal is not taken into consideration in this method for suppressing generation of noise by synthesizing image signals having a plurality of frequency bands.

When a single board sensor such as a primary-color Bayer arrangement is used, each pixel has all color signals without performing compensation by downsampling processing at a time of band division.

The reason thereof is described below. Here, a case where the downsampling processing is performed on half of pixels in the horizontal direction will be described.

It is assumed that color filters R, G, R, G, and so on are arranged in this order in a certain row. In this row, when only R signals are focused on, the R signals which have been arranged in every other pixel are arranged in every pixel through the downsampling processing. Furthermore, also when only G signals are focused on, the G signals which have been arranged in every other pixel are arranged in every pixel through the downsampling processing. Note that, in the downsampling processing performed on the G signals, values are obtained by calculating average values using adjacent pixel values so that gravity positions of the G signals correspond to those of the R signals. As described above, by performing the downsampling processing, all the R, G, and B color signals are generated in the same pixel positions without compensation. Hereinafter, this process of generating a plurality of types of signal in the same pixel positions is referred to as "synchronization".

Since image signals which have been subjected to the downsampling processing are subjected to the synchronization, an original image signal should be subjected to the synchronization in order to synthesize the original image signal with an image signal which has been subjected to the downsampling processing. However, irrespective of the downsampling processing performed to suppress generation of noise, when the original image signal is subjected to the synchronization, an aliasing signal included in the original image signal may be superposed on the synthesized image signal.

The present invention has been made in view of the above problem, and it is an object of the present invention to provide an image processing apparatus which performs noise processing by dividing an input signal into a plurality of signals in frequency bands and which is capable of suppressing generation of an aliasing signal included in an image signal which is generated by sampling performed by an image pickup element.

SUMMARY OF INVENTION

According to an aspect of the present invention, an apparatus including a generating unit configured to receive an image signal and generate a plurality of image signals in different frequency bands from the image signal, a synthesizing unit configured to synthesize the generated plurality of image signals with one another, first signal generating unit configured to receive an image signal including a plurality of color signals including a first color signal and generate a first signal using image signals obtained by compensating for pixels which do not correspond to the first color signal by the first color signal, a second signal generating unit configured to receive a signal including a plurality of color signals including the first color signal and generating a second luminance signal using the plurality of color signals, and a mixing unit configured to generate a third signal by synthesizing the first and second signals with each other or by selecting one of the first and second signals. A signal, among the plurality of signals, which has a highest frequency band includes the third signal.

According to another aspect of the present invention, a method includes receiving a signal and generating a plurality of signals in different frequency bands from the signal, synthesizing the generated plurality of signals with one another, receiving a signal including a plurality of color signals including a first color signal and generating a first signal using signals obtained by compensating for pixels which do not correspond to the first color signal by the first color signal, receiving a signal including a plurality of color signals including the first color signal and generating a second signal using the plurality of color signals, and generating a third signal with each other or by selecting one of the first and second signals. An image signal, among the plurality of image signals, which has the highest frequency band includes the third signal.

Further features of the present invention will become apparent from the following description of exemplary embodiments with reference to the attached drawings.

BRIEF DESCRIPTION OF DRAWINGS

FIG. 15 is a diagram illustrating a case where each pixel has all color signals through downsampling processing.

DESCRIPTION OF EMBODIMENTS

First Embodiment

Figure 1:
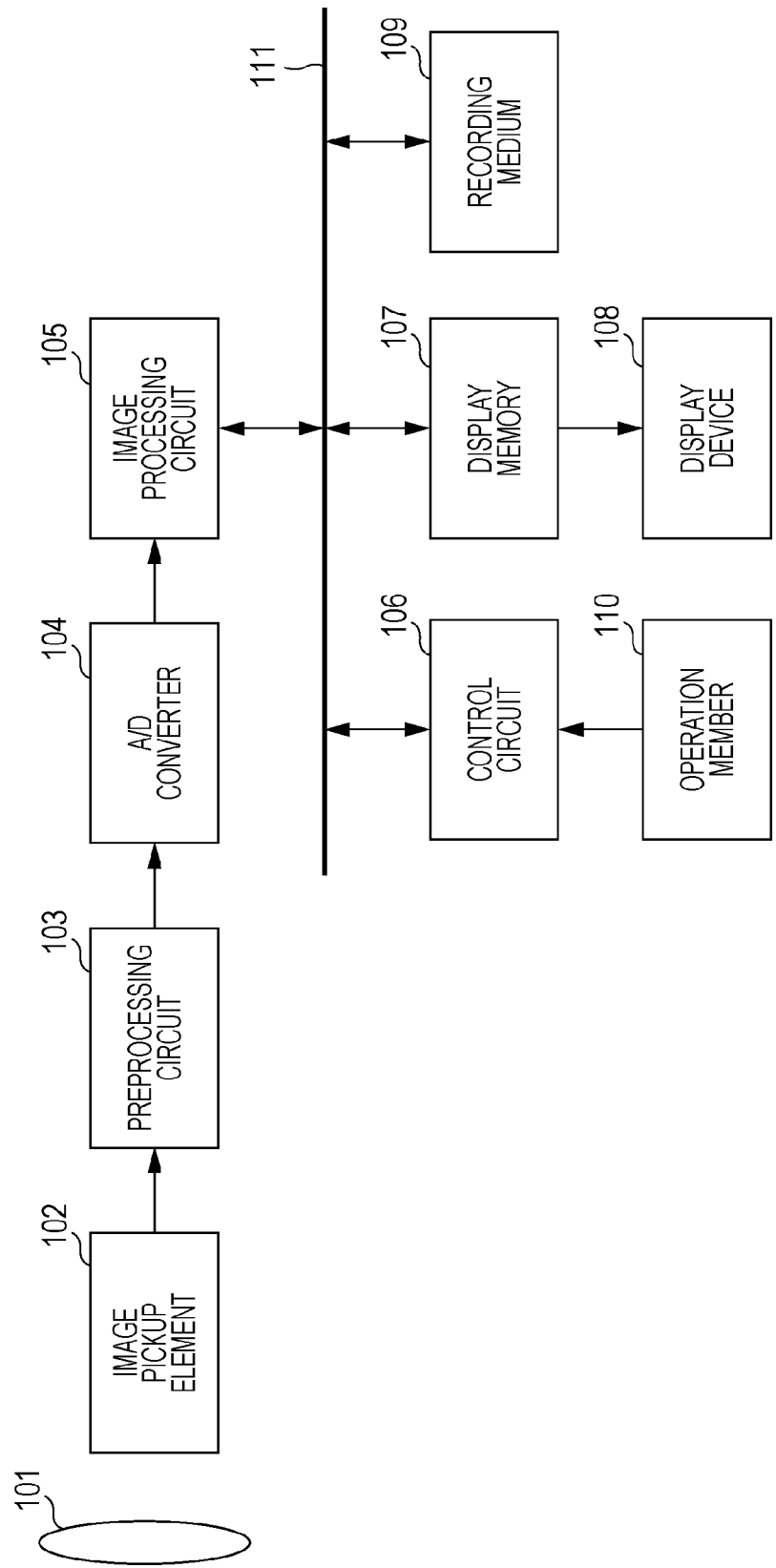
FIG. 1 is a diagram schematically illustrating a configuration of a digital still camera according to embodiments of the present invention.

FIG. 1 is a diagram schematically illustrating a configuration of a digital still camera according to embodiments of the present invention. The present invention can be realized by digital video cameras and personal computers in addition to digital still cameras as long as devices can perform image processing on image signals.

In FIG. 1, an optical system 101 includes a lens unit including a zoom lens and a focus lens, an aperture device, and a shutter device. The optical system 101 controls magnification and a focus position of an object image to be supplied to an image pickup element 102 and light quantity. The image pickup element 102 corresponds to a photoelectric conversion element such as a CCD (Charge Coupled Device) sensor and a CMOS (Complementary Metal Oxide Semiconductor) sensor, and generates an image signal by converting the object image into an electric signal. In this embodiment, the image pickup element 102 is constituted by the CCD sensor.

A preprocessing circuit 103 includes a CDS (Correlated Double Sampling) circuit and an amplifying circuit. The CDS circuit suppresses generation of dark current in the image signal generated by the image pickup element 102 and the amplifying circuit amplifies the image signal output from the CDS circuit. An A/D converter 104 converts the image signal output from the preprocessing circuit 103 into a digital image signal.

An image processing circuit 105 performs white-balance processing, noise suppression processing, gradation conversion processing, and contour correction processing on the image signal so as to convert the image signal into a luminance signal Y and color difference signals U and V to be output. Furthermore, the image processing circuit 105 calculates a luminance value of the object and a focus value representing a focus state of the object from the image signal. The image processing circuit 105 may perform the same image processing also on an image signal read from a recording medium 109 as well as the image signal output from the A/D converter 104. A control circuit 106 controls the various circuits included in a digital still camera according to this embodiment so as to control operation of the digital still camera. The control circuit 106 also performs driving control on the optical system 101 and the image pickup element 102 in accordance with a luminance value obtained from the image signal which has been processed by the image processing circuit 105 or an instruction supplied from an operation member 110.

A display memory 107 temporarily stores an image signal corresponding to an image to be displayed in a display device 108. The display device 108 includes a liquid crystal display or an electroluminescence display, and displays an image using the image signal generated by the image pickup element 102 or the image signal read from a recording medium 109. The display device 108 updates and displays image signals consecutively read from the image pickup element 102 where appropriate to thereby function as an electronic view finder. The display device 108 can display not only images but also a state of the digital still camera, a shutter speed selected by a user or determined by the camera, an aperture value, text information including sensitivity information, and a graph representing luminance distribution measured by the image processing circuit 105. The recording medium 109 may be detachable from the digital still camera or may be incorporated in the digital still camera.

The operation member 110 is operated when an instruction is supplied from the user to the digital still camera. A bus 111 is used to transmit image signals among the image processing circuit 105, the control circuit 106, the display memory 107, and the recording medium 109.

Next, an example of the operation of the digital still camera according to this embodiment performed when an image is captured will be described.

When the user operates the operation member 110 so that an instruction for starting preparation of image capturing is supplied, the control circuit 106 starts controlling operations of the circuits.

The image pickup element 102 performs photoelectric conversion on an object image supplied from the optical system 101 so as to generate an analog image signal. The A/D converter 104 digitalizes the analog image signal which has been processed by the preprocessing circuit 103. The image processing circuit 105 performs the white-balance processing, the noise suppression processing, the gradation conversion processing, and the contour correction processing on the image signal output from the A/D converter 104.

The image signal processed by the image processing circuit 105 is supplied to the display memory 107 and displayed in the display device 108 as an image. As described above, the image pickup element 102 consecutively generates image signals and the display device 108 updates and displays object images in real time using the read consecutive image signals where appropriate to thereby function as an electronic view finder.

This process is repeatedly performed until the user operates a shutter button included in the operation member 110. When the user operated the shutter button, the control circuit 106 controls the operation of the optical system 101 again in accordance with the luminance value and the focus value obtained by the image processing circuit 105 and performs capturing of a still image. The image processing circuit 105 performs various image processes including the noise suppression processing on an image signal corresponding to the still image. Then, the recording medium 109 records the image signal output from the image processing circuit 105.

Figure 2:
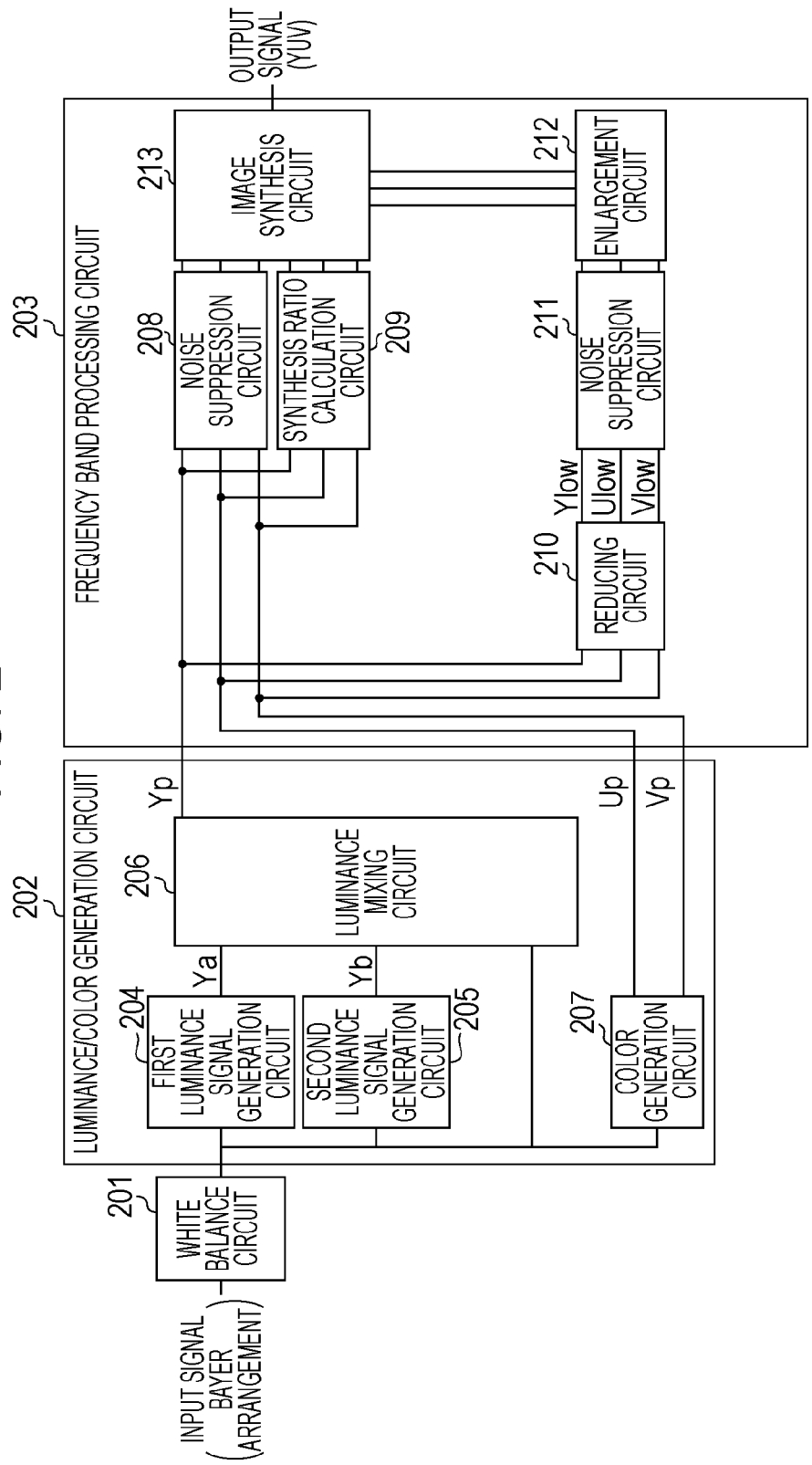
FIG. 2 is a diagram illustrating part of a configuration of an image processing circuit according to a first embodiment of the present invention.

Here, the noise suppression processing performed by the image processing circuit 105 which is a characteristic of the present invention will be described in detail. FIG. 2 is a diagram illustrating part of a configuration of the image processing circuit 105.

The image processing circuit 105 includes a white balance circuit 201, a luminance/color generation circuit 202, and a frequency band processing circuit 203. The luminance/color generation circuit 202 includes a first luminance signal generation circuit 204, a second luminance signal generation circuit 205, a luminance mixing circuit 206, and a color generation circuit 207. The frequency band processing circuit 203 includes a noise suppression circuit 208, a synthesis-ratio calculation circuit 209, a reducing circuit 210, a noise suppression circuit 211, an enlargement circuit 212, and an image synthesis circuit 213.

Figure 3:
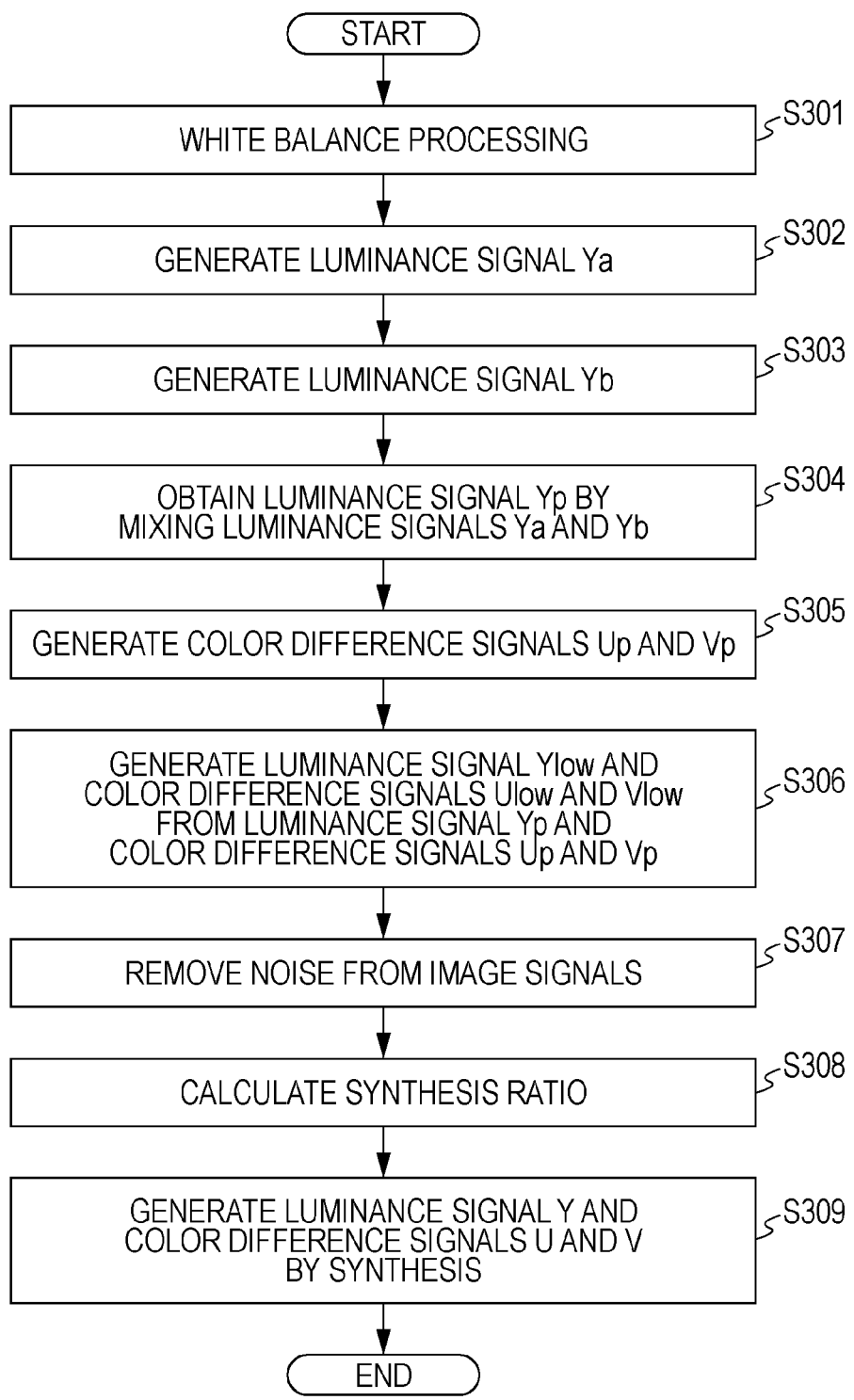
FIG. 3 is a flowchart illustrating a process performed by the image processing circuit shown in FIG. 2.

FIG. 3 is a flowchart illustrating processes performed by the white balance circuit 201, the luminance/color generation circuit 202, and the frequency band processing circuit 203 included in the image processing circuit 105. When receiving an image signal output from the A/D converter 104, the image processing circuit 105 performs the processes included in the flowchart shown in FIG. 3.

In step S301, the white balance circuit 201 performs the white balance processing on the image signal supplied from the A/D converter 104. Here, the image signal has a RAW format and each pixel has a color signal corresponding to R, G, or B. The white balance circuit 201 calculates gain coefficients for individual color signals so that signal levels of R, G, and B relative to an object regarded as a white object are substantially equal to one another. Note that the calculation of the gain coefficients may be performed by a general method, and therefore, a detailed description thereof is omitted.

Figure 4:
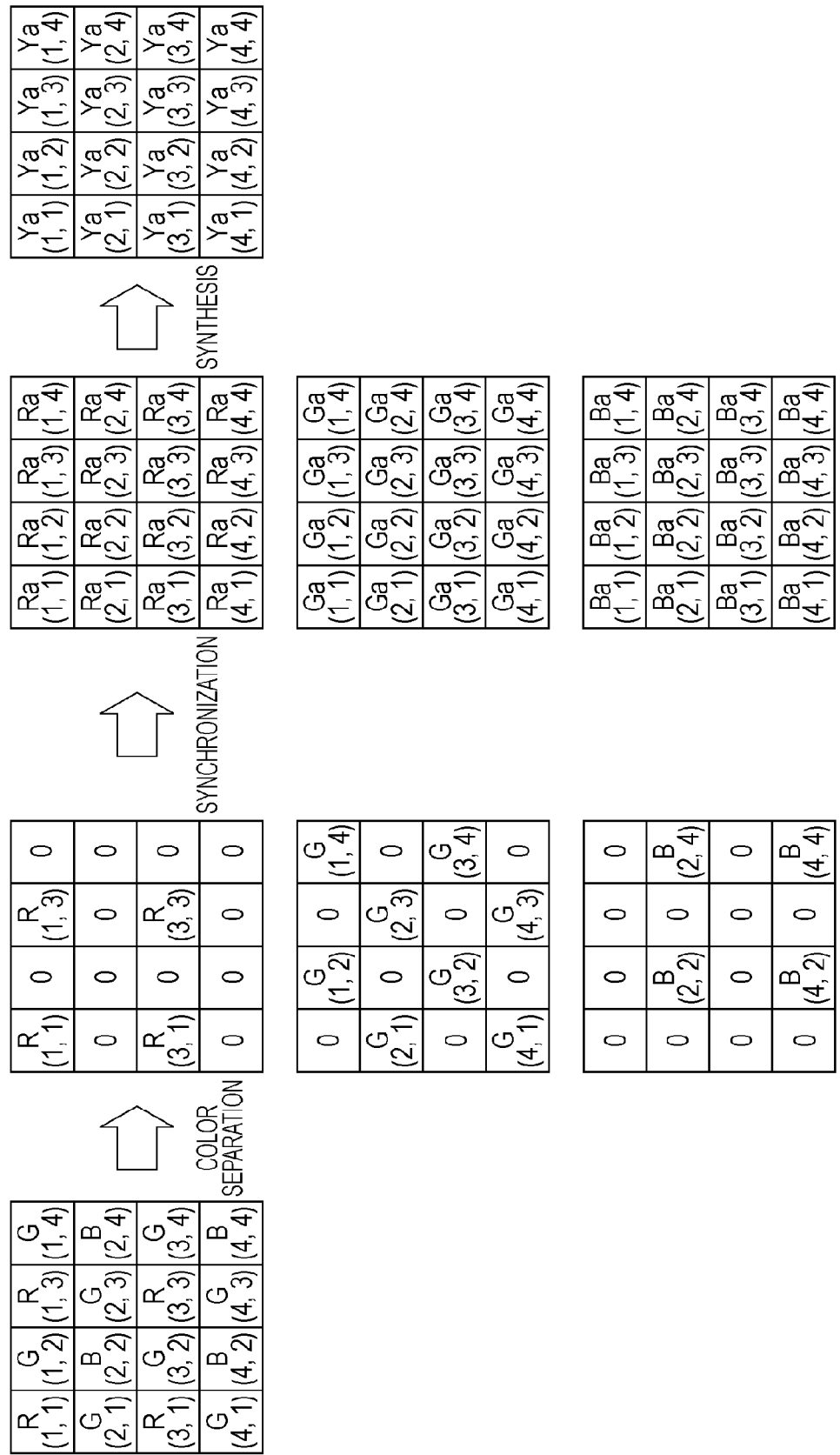
FIG. 4 is a diagram illustrating a process of generating a first luminance signal performed by a first luminance signal generation circuit shown in FIG. 2.

In step S302, the first luminance signal generation circuit 204 generates a first luminance signal Ya. FIG. 4 is a diagram illustrating a process of generating the first luminance signal Ya performed by the first luminance signal generation circuit 204.

As shown in FIG. 4, the first luminance signal generation circuit 204 receives image signals of the RAW format in a Bayer arrangement which are output from the white balance circuit 201 and separates the image signals of the RAW format according to colors. Specifically, an image signal including G signals obtained by inserting 0 to signals of pixels other than G pixels, an image signal including R signals obtained by inserting 0 to signals of pixels other than R pixels, and an image signal including B signals obtained by inserting 0 to signals of pixels other than B pixels are generated.

Next, the first luminance signal generation circuit 204 generates color signals for the pixels through compensation processing whereby synchronization is performed.

For example, in the image signal including the R signals, assuming that a signal at a coordinate (m, n) which has not been subjected to the compensation processing is represented by R(m, n) and a signal at the coordinate (m, n) which has been subjected to the compensation processing is represented by Ra(m, n), the signal Ra(m, n) which has been subjected to the compensation processing is calculated by Expression (1) to Expression (4) below.

$$Ra(1,1)=R(1,1) \quad (1)$$

$$Ra(1,2)=\{R(1,1)+R(1,3)\}/2 \quad (2)$$

$$Ra(2,1)=\{R(1,1)+R(3,1)\}/2 \quad (3)$$

$$Ra(2,2)=\{R(1,1)+R(1,3)+R(3,1)+R(3,3)\}/4 \quad (4)$$

In the image signal including the B signals, a signal Ba(m, n) which has been subjected to the compensation processing is obtained by a similar method.

Furthermore, in the image signal including the G signals, a signal Ga(m, n) which has been subjected to the compensation processing can be calculated by Expression (5) to Expression (8) below.

$$Ga(2,2)=\{G(1,2)+G(3,2)+G(2,1)+G(2,3)\}/4 \quad (5)$$

$$Ga(2,3)=\{4 \times G(2,3)+G(1,2)+G(1,4)+G(3,2)+G(3,4)\}/8 \quad (6)$$

$$Ga(3,2)=\{4 \times G(3,2)+G(2,1)+G(2,3)+G(4,1)+G(4,3)\}/8 \quad (7)$$

$$Ga(3,3)=\{G(2,3)+G(4,3)+G(3,2)+G(3,4)\}/4 \quad (8)$$

These compensation methods are merely examples, and various other known compensation methods may be employed. For example, in order to suppress deterioration of high-frequency characteristics of an original signal, the correlations of an object in various directions may be determined in advance and larger weight may be applied to signals positioned in a direction having the highest correlation so that the compensation processing is performed.

The Ra, Ga, and Ba signals obtained as described above are assigned to Expression (9) below whereby a first luminance signal Ya(m, n) at the coordinate (m, n) is obtained.

$$Ya(m,n)=0.3 \times Ra(m,n)+0.6 \times Ga(m,n)+0.1 \times Ba(m,n) \quad (9)$$

Then, the first luminance signal generation circuit 204 supplies the obtained first luminance signal Ya to the luminance mixing circuit 206.

Note that the description has been made taking the case where the first luminance signal Ya is obtained using the Ra, Ga, and Ba signals as an example. However, the Ga signal may be used as the first luminance signal Ya.

Figure 5:
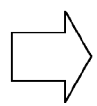
FIG. 5 is a diagram illustrating a process of generating a second luminance signal performed by a second luminance signal generation circuit shown in FIG. 2.

In step S303, the second luminance signal generation circuit 205 generates a second luminance signal Yb. Unlike the first luminance signal Ya, the second luminance signal Yb is generated using pixel signals of all the colors without distinguishing the colors. FIG. 5 is a diagram illustrating a process of generating the second luminance signal Yb performed by the second luminance signal generation circuit 205.

The second luminance signal generation circuit 205 receives the image signal of the RAW format shown in FIG. 5 which has been output from the white balance circuit 201. The second luminance signal generation circuit 205 performs vertical low-pass filter (V-LPF) processing and horizontal low-pass filter (H-LPF) processing on the image signal of the RAW format so as to generate the second luminance signal Yb. In the V-LPF processing and the H-LPF processing, for example, a filter coefficient represented by [1, 2, 1] is used. Alternatively, a filter direction and the filter coefficient may be appropriately changed in accordance with an edge state of the image signal and a level of the correlation with surrounding pixels.

Note that the process to be performed by the second luminance signal generation circuit 205 may be omitted and the image signal of the RAW format may be used as the second luminance signal Yb. That is, the second luminance signal Yb may be obtained for each pixel by Expression (10) to Expression (13) below.

$$Yb(1,1)=R(1,1) \quad (10)$$

$$Yb(1,2)=G(1,2) \quad (11)$$

$$Yb(2,1)=G(2,1) \quad (12)$$

$$Yb(2,2)=B(2,2) \quad (13)$$

In step S304, the luminance mixing circuit 206 mixes the first and second luminance signals Ya and Yb so as to generate a luminance signal Yp. Assuming that a mixing ratio of the first luminance signal in the luminance signal Yp is represented by α, the luminance mixing circuit 206 obtains the luminance signal Yp for each pixel by assigning the first and second luminance signals Ya and Yb to Expression (14) below for each pixel.

$$Yp=\alpha \times Ya+(1-\alpha) \times Yb \quad (14)$$

Note that, in this embodiment, the luminance mixing circuit 206 determines the mixing ratio α of the first luminance signal in the luminance signal Yp in accordance with a saturation S of the object. A method for obtaining the mixing ratio α will be described. As with the first luminance signal generation circuit 204, the luminance mixing circuit 206 separates the image signal of the RAW format according to colors so as to perform synchronization. Then, the saturation S for each pixel is obtained by adding an absolute value of a difference between the R signal and the G signal to an absolute value of a difference between the B signal and the G signal for each pixel.

$$S=|R-G|+|B-G| \quad (15)$$

Figure 6:
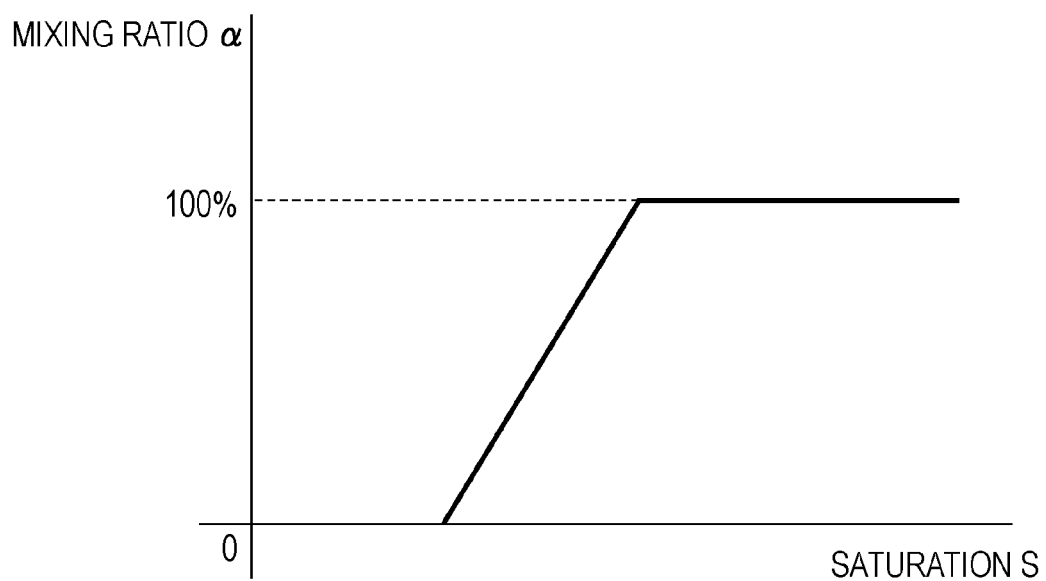
FIG. 6 is a diagram illustrating a mixing ratio of a first luminance signal obtained in accordance with a saturation.

The luminance mixing circuit 206 reads the mixing ratio α obtained in accordance with the saturation S from a memory, not shown. FIG. 6 is a diagram illustrating the mixing ratio α of the first luminance signal obtained in accordance with the saturation S. As shown in FIG. 6, a luminance mixing circuit 206 performs control such that the large mixing ratio α is obtained, that is, a large mixing ratio of the first luminance signal Ya is obtained, for a pixel having a high saturation whereas a small mixing ratio α is obtained, that is, a large mixing ratio of the second luminance signal Yb is obtained, for a pixel having a low saturation.

Note that the method for obtaining the mixing ratio between the first and second luminance signals Ya and Yb is not limited to this, and a mixing ratio obtained using an absolute value of a difference between the R and G signals may be multiplied by a mixing ratio obtained using an absolute value of a difference between the B and G signals so that a final mixing ratio is determined. Alternatively, the first and second luminance signals Ya and Yb may not be added to each other for synthesis but only one of the first and second luminance signals Ya and Yb which has a higher mixing ratio may be selected. Alternatively, when a certain region is determined to have the correlation in the oblique direction which is higher than a threshold value, the second luminance signal Yb may be used only for the region. Furthermore, since a color configuration ratio included in a high-frequency component of the first luminance signal Ya is different from that of the second luminance signal Yb, a value of the first luminance signal Ya and a value of the second luminance signal Yb are considerably different from each other when the object has a certain color which occupies a large area of the object. Therefore, a low frequency component of the first luminance signal Ya and a high frequency component of the second luminance signal Yb may be obtained and synthesized with each other so that a third luminance signal Yc is obtained, and the third luminance signal Yc and the first luminance signal Ya may be mixed with each other in the mixing ratio described above.

In step S305, the color generation circuit 207 generates color difference signals Up and Vp using an RGB signal output from the white balance circuit 201. The color generation circuit 207 generates the color difference signals Up and Vp by performing color compensation processing, fake color removing processing, and matrix conversion on the RGB signal. General methods may be used as a method for generating the color difference signals Up and Vp. Since the methods are generally known, detailed descriptions thereof are omitted.

By performing the processes from step S301 to step S305, the luminance signal Yp in which an aliasing signal is suppressed and the color difference signals Up and Vp are generated in the luminance/color generation circuit 202, and these signals are supplied to the frequency band processing circuit 203.

In step S306, the reducing circuit 210 receives the luminance signal Yp generated by the luminance mixing circuit 206 and the color difference signals Up and Vp generated by the color generation circuit 207, and generates an image signal having a lower frequency band using the received signals.

The reducing circuit 210 performs the V-LPF processing and the H-LPF processing using the filter coefficient represented by [1, 2, 1] on the luminance signal Yp and the color difference signals Up and Vp. Then, the reducing circuit 210 performs downsampling processing on the luminance signal Yp and the color difference signals Up and Vp so that the number of pixels is reduced by half in the horizontal and vertical directions. In this way, the reducing circuit 210 generates a luminance signal $Y_{low}$ and color difference signals $U_{low}$ and $V_{low}$.

In this embodiment, the highest frequency band of a low-frequency layer image signal corresponds to half of the highest frequency band of a high-frequency layer image signal, and a frequency band on a lower side of the high-frequency layer image signal overlaps with a frequency band of the low-frequency layer image signal.

In step S307, the noise suppression circuit 208 performs noise suppression processing on the high-frequency layer image signal, and the noise suppression circuit 211 performs noise suppression processing on the low-frequency layer image signal. Since content of the processing performed by the noise suppression circuit 208 and content of the processing performed by the noise suppression circuit 211 are the same as each other, a description will be made taking the noise suppression processing performed by the noise suppression circuit 208 as an example in this embodiment.

The noise suppression circuit 208 performs the noise suppression processing using a luminance signal Yp of a target pixel of the high-frequency layer image signal and luminance signals Yp of surrounding pixels included in a matrix of 5 rows and 5 columns including the target pixel as a center.

The noise suppression circuit 208 calculates absolute values of differences between the luminance signal Yp of the target pixel and the luminance signals Yp of the surrounding signals and compares the absolute values with a threshold value. Specifically, assuming that the luminance signal Yp of the target pixel is represented by Yp(s, t), the luminance signals Yp of the surrounding pixels are represented by Yp(i, j), and a threshold value is represented by $TH_Y$, luminance signals Y(i, j) which satisfies Expression (16) is obtained as follows.

$$|Yp(i,j)-Yp(s,t)|<TH_Y$$

Note that $$s-2 \leq i \leq s+2,\ t-2 \leq j \leq t+2 \quad (16)$$

After the luminance signals Y(i, j) which satisfy Expression (16) are extracted, an average value thereof is assigned to the luminance signal Yp(s, t) of the target pixel.

Furthermore, assuming that color difference signals of the target pixel is represented by Up(s, t) and Vp(s, t), color difference signals of the surrounding pixels are represented by Up(i, j) and Vp(i, j), and a threshold value is represented by $TH_C$, the values Up(i, j) and Vp(i, j) which satisfy Expression (17) are obtained as follows.

$$|Up(i,j)-Up(s,t)|+|Vp(i,j)-Vp(s,t)|<TH_C$$

Note that $$s-2 \leq i \leq s+2,\ t-2 \leq j \leq t+2 \quad (17)$$

Then, the values Up(i, j) and the values Vp(i, j) which satisfy Expression (17) are extracted, and average values of the values Up(i, j) and the values Vp(i, j) are assigned to the color difference signals Up(s, t) and Vp(s, t), respectively.

The noise suppression circuit 208 suppresses noise of the high-frequency layer image signal by performing the processing regarding the luminance signal Yp and the color difference signals Up and Vp on all the pixels. Note that, since the range of the matrix of 5 rows and 5 columns is not able to set to pixels located in edge portions of pixel signals, noise suppression is performed on such pixels by appropriately changing a method for setting surrounding pixels.

The noise suppression circuit 211 also suppresses noise of the low-frequency layer image signal by performing the similar processing on the luminance signal $Y_{low}$ and the color difference signals $U_{low}$ and $V_{low}$ of the low-frequency layer image signal. However, a method for suppressing noise is obviously not limited to this and other known methods for suppressing noise may be employed.

Figures 7, 8:
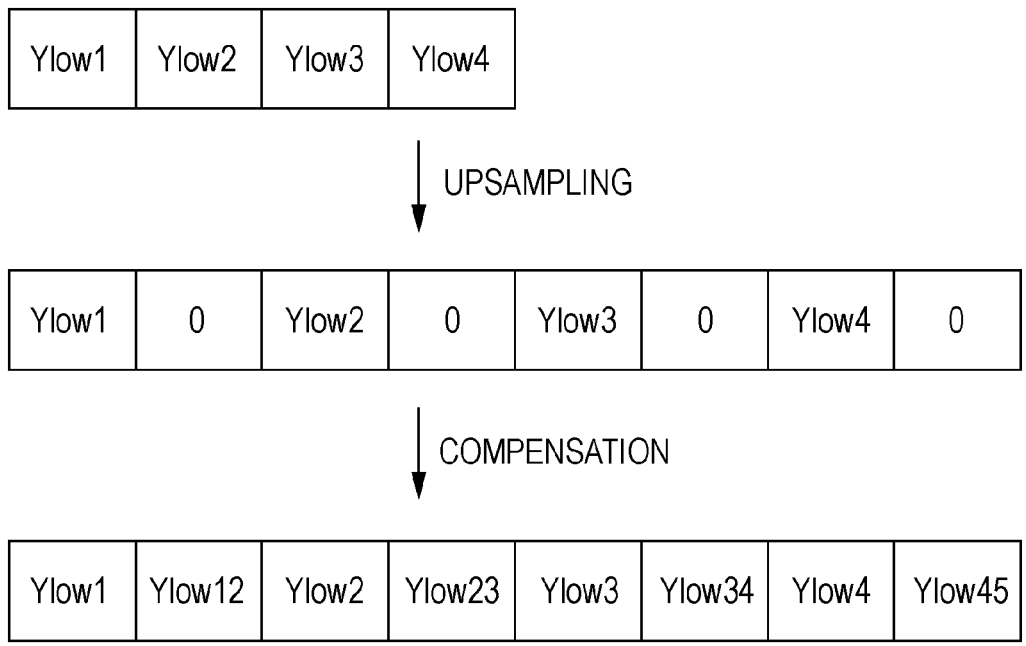
FIG. 7 is a diagram illustrating upsampling processing performed by an enlargement circuit.
FIG. 8 is a diagram illustrating a filter coefficient used for edge detection performed by a synthesis-ratio calculation circuit.

Then, the low-frequency layer image signal which has been subjected to the noise suppression processing by the noise suppression circuit 211 is supplied to the enlargement circuit 212. The enlargement circuit 212 performs upsampling processing on the low-frequency layer image signal which has been subjected to the noise suppression processing so that the number of pixels of the low-frequency layer image signal becomes equal to the number of pixels of the high-frequency layer image signal. Specifically, as shown in FIG. 7, the number of pixels of the low-frequency layer image signal is doubled and signals of pixels which are newly generated are set to 0. Then, signals are assigned to all the pixels by performing linear compensation on the pixels having the value 0 using values of surrounding pixels, for example. This processing is performed on the luminance signal $Y_{low}$ and the color difference signals $U_{low}$ and $V_{low}$.

Figure 9:
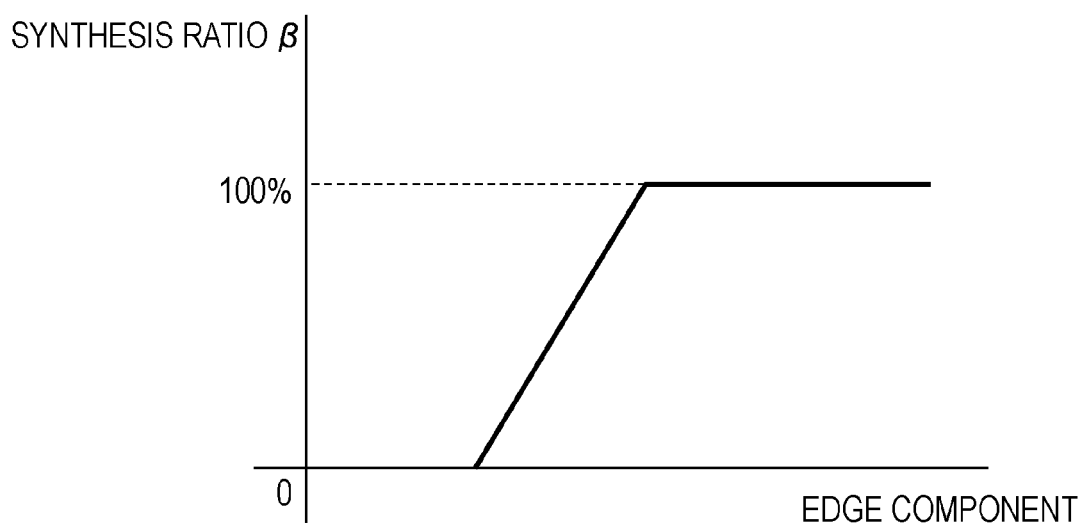
FIG. 9 is a diagram illustrating a mixing ratio of a high-frequency layer image signal relative to an edge component.

In step S308, the synthesis-ratio calculation circuit 209 calculates a synthesis ratio between the high-frequency layer image signal and the low-frequency layer image signal. Specifically, the synthesis-ratio calculation circuit 209 obtains edge components of pixels of the luminance signal Yp of the high-frequency layer image signal using a filter shown in FIG. 8. Then, the synthesis-ratio calculation circuit 209 reads mixing ratios β corresponding to the edge components from the memory, not shown. FIG. 9 is a diagram illustrating a mixing ratio β of a high-frequency layer image signal relative to an edge component. As shown in FIG. 9, the synthesis-ratio calculation circuit 209 assigns a large mixing ratio β to a pixel having a high edge component so that a mixing ratio of the high-frequency layer image signal relative to the low-frequency layer image signal becomes high whereas the synthesis-ratio calculation circuit 209 assigns a low mixing ratio β to a pixel having a low edge component so that a mixing ratio of the low-frequency layer image signal relative to the high-frequency layer image signal becomes high.

In step S309, the image synthesis circuit 213 synthesizes the luminance signal Yp of the high-frequency layer image signal and the low-frequency layer image signal $Y_{low}$ with each other using the mixing ratio β obtained by the synthesis-ratio calculation circuit 209 so as to obtain a luminance signal Y. Specifically, the luminance signal Yp of the high-frequency layer image signal which has been subjected to the noise suppression processing and the luminance signal $Y_{low}$ of the low-frequency layer image signal which has been subjected to enlargement processing performed by the enlargement circuit 212 are added to each other in accordance with Expression (18).

$$Y=\beta \times Yp+(1-\beta) \times Y_{low} \quad (18)$$

Similarly, the color difference signals Up and Vp of the high-frequency layer image signal which has been subjected to the noise suppression processing by the noise suppression circuit 208 and the color difference signals $U_{low}$ and $V_{low}$ of the low-frequency layer image signal which has been subjected to the enlargement processing by the enlargement circuit 212 are added to each other, respectively, in accordance with Expressions (19) and (20).

$$U=\beta \times Up+(1-\beta) \times U_{low} \quad (19)$$

$$V=\beta \times Vp+(1-\beta) \times V_{low} \quad (20)$$

As described above, since a configuration in which image signals in a plurality of frequency bands are generated from an image signal in which generation of an aliasing signal is suppressed in advance is employed, even when the image signals in the plurality of frequency bands are synthesized with one another, generation of an aliasing signal can be suppressed.

Note that, in this embodiment, the description has been made taking the configuration in which only the low-frequency layer image signal in one layer is generated as an example. However, the configuration is not limited to this. A plurality of reducing circuits 210, a plurality of noise suppression circuits 211, and a plurality of enlargement circuits 212 may be provided so as to perform noise suppression processing on low-frequency layer image signals in multi layers in different frequency bands, and thereafter, the low-frequency layer image signals may be synthesized with one another by the image synthesis circuit 213.

Second Embodiment

Next, a second embodiment of the present invention will be described. In this embodiment, image signals of a plurality of frequency bands are generated, and a process of suppressing generation of an aliasing signal is performed on some of the image signals. A basic configuration is the same as that of the first embodiment, and therefore, different points will be mainly described.

Figure 10:
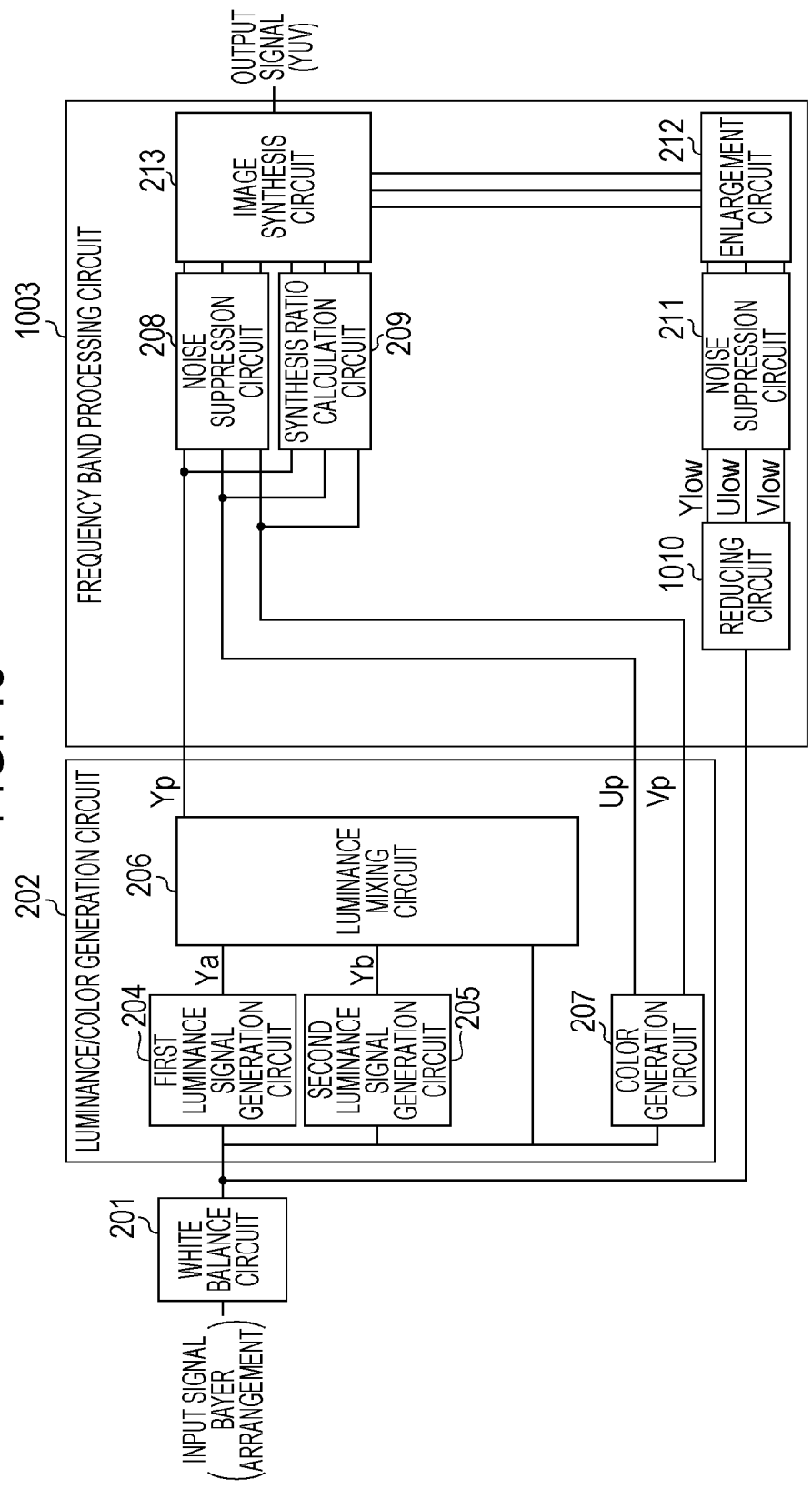
FIG. 10 is a diagram illustrating part of a configuration of an image processing circuit according to a second embodiment of the present invention.

FIG. 10 is a diagram illustrating part of a configuration of an image processing circuit 105 according to this embodiment. In FIG. 10, circuits having configuration the same as those of FIG. 2 are denoted by reference numerals the same as those shown in FIG. 2. The image processing circuit 105 of this embodiment includes a white balance circuit 201, a luminance/color generation circuit 202, and a frequency band processing circuit 1003.

The frequency band processing circuit 1003 includes a noise suppression circuit 208, a synthesis-ratio calculation circuit 209, a reducing circuit 1010, a noise suppression circuit 211, an enlargement circuit 212, and an image synthesis circuit 213. In the first embodiment, the luminance signal $Y_{low}$ and the color difference signals $U_{low}$ and $V_{low}$ are generated by inputting the luminance signal Yp and the color difference signals Up and Vp to the reducing circuit 210. However, in this embodiment, a luminance signal $Y_{low}$ and color difference signals $U_{low}$ and $V_{low}$ are generated using an RGB signal of a RAW format output from the white balance circuit 201, and processing of suppressing generation of an aliasing signal is performed only on a high-frequency layer image signal.

Figure 11:
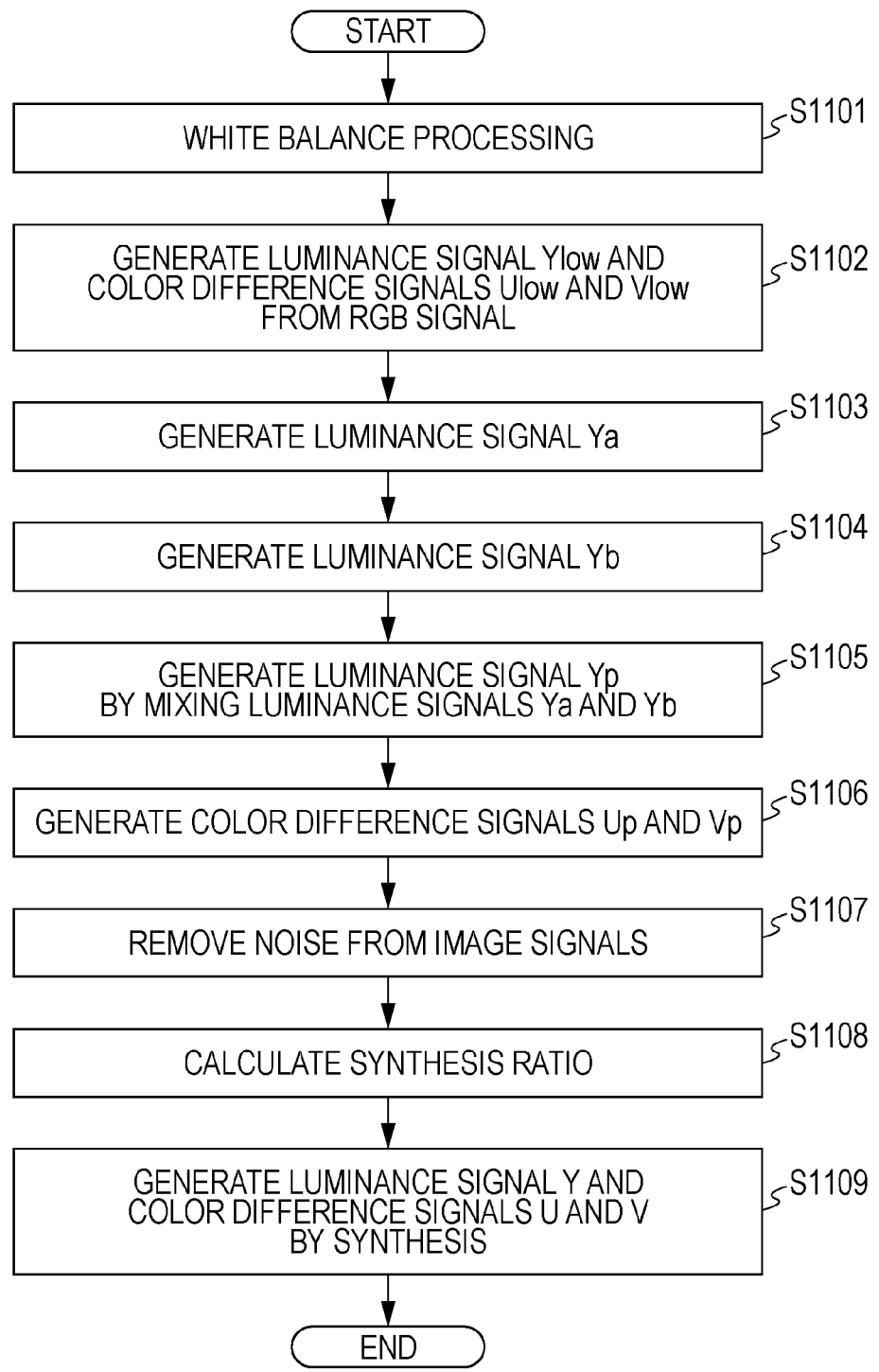
FIG. 11 is a flowchart illustrating a process performed by the image processing circuit shown in FIG. 10.

FIG. 11 is a flowchart illustrating processes performed by the white balance circuit 201, the luminance/color generation circuit 202, and the frequency band processing circuit 1003 included in the image processing circuit 105.

In step S1101, the white balance circuit 201 performs white balance processing on an image signal supplied from an A/D converter 104.

In step S1102, the reducing circuit 1010 separates the image signal of a RAW format in a Bayer arrangement into image signals according to colors. Specifically, an image signal including G signals obtained by inserting 0 to signals of pixels other than G pixels, an image signal including R signals obtained by inserting 0 to signals of pixels other than R pixels, and an image signal including B signals obtained by inserting 0 to signals of pixels other than B pixels are generated. Then, V-LPF processing and H-LPF processing are performed on the image signals obtained according to colors using a filter coefficient represented by [1, 2, 1], for example, whereby synchronization is performed. Thereafter, the reducing circuit 1010 performs downsampling processing on the image signals obtained for individual colors, that is, synchronized image signals, so as to generate image signals including a number of pixels reduced by half in horizontal and vertical directions. Then, a calculation is performed in accordance with Expression (9) using the image signals which have been subjected to the downsampling processing so that a luminance signal $U_{low}$ and color difference signals $U_{low}$ and $V_{low}$ are generated.

In step S1103, the first luminance signal generation circuit 204 generates a first luminance signal Ya using the image signal of the RAW format in the Bayer arrangement output from the white balance circuit 201 through a process similar to that in step S302 of FIG. 3.

In step S1104, the second luminance signal generation circuit 205 generates a second luminance signal Yb using the image signal of the RAW format in the Bayer arrangement output from the white balance circuit 201 through a process similar to that performed in step S303 of FIG. 3.

In step S1105, the luminance mixing circuit 206 mixes the first and second luminance signals Ya and Yb through a process similar to that performed in step S304 of FIG. 3 so as to generate a luminance signal Yp.

In step S1106, the color generation circuit 207 generates color difference signals Up and Vp using the RGB signal output from the white balance circuit 201 through a process similar to that performed in step S305 of FIG. 3.

In step S1107, the noise suppression circuit 208 performs noise suppression processing on a high-frequency layer image signal, and the noise suppression circuit 211 performs noise suppression processing on a low-frequency layer image signal. The noise suppression processing is similar to that performed in step S307 of FIG. 3.

In step S1108, the synthesis-ratio calculation circuit 209 calculates a synthesis ratio between the high-frequency layer image signal and the low-frequency layer image signal through a process similar to that performed in step S308 of FIG. 3.

In step S1109, the image synthesis circuit 213 synthesizes the high-frequency layer image signal and the low-frequency layer image signal with each other using a mixing ratio β obtained by the synthesis-ratio calculation circuit 209 through a process similar to that performed in step S209 of FIG. 3.

As described above, in this embodiment, although the process of suppressing generation of an aliasing signal is performed on the high-frequency layer image signal, the process of suppressing generation of an aliasing signal is not performed on the low-frequency layer image signal output from the reducing circuit 1010. This is because it is considered that influence of an aliasing signal has been suppressed since the image signal has been subjected to low-pass filter processing so that the image signal is smoothed in the course of the generation of the low-frequency layer image signal.

As described above, image signals in a plurality of frequency bands are generated from an image signal and an aliasing signal is prevented from being generated in an image signal having the highest frequency band in advance. By this, even when the image signals of the plurality of frequency bands are synthesized with one another, generation of aliasing signals can be suppressed.

Third Embodiment

Next, a third embodiment of the present invention will be described. In the first embodiment, the frequency band processing circuit 203 generates an image signal having a frequency band lower than that of an original image signal. However, this embodiment is different from the first embodiment in that an original signal is divided into a plurality of frequency components of different frequency bands.

Figure 12:
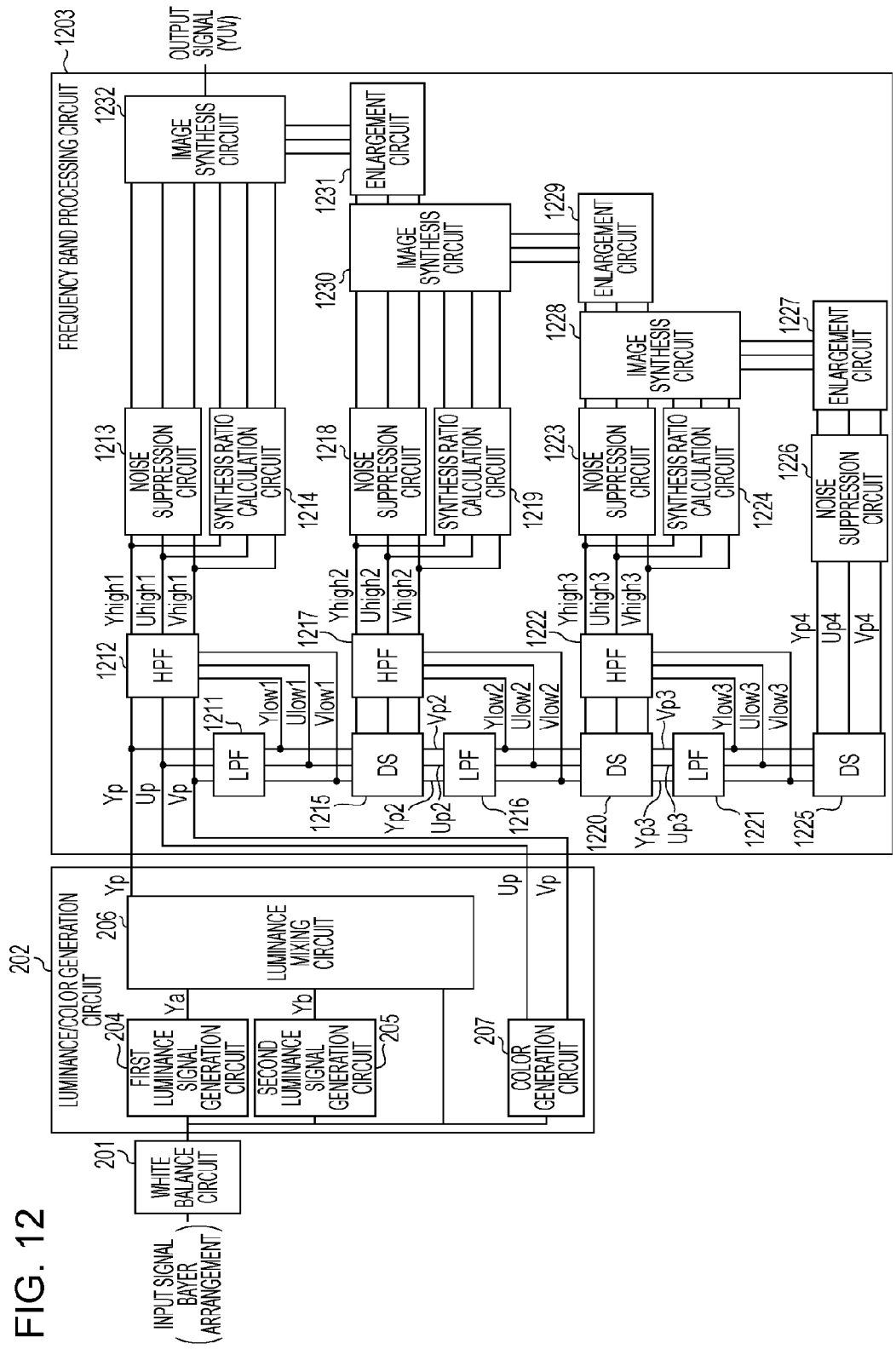
FIG. 12 is a diagram illustrating part of a configuration of an image processing circuit according to a third embodiment of the present invention.
Figures 13, 14:
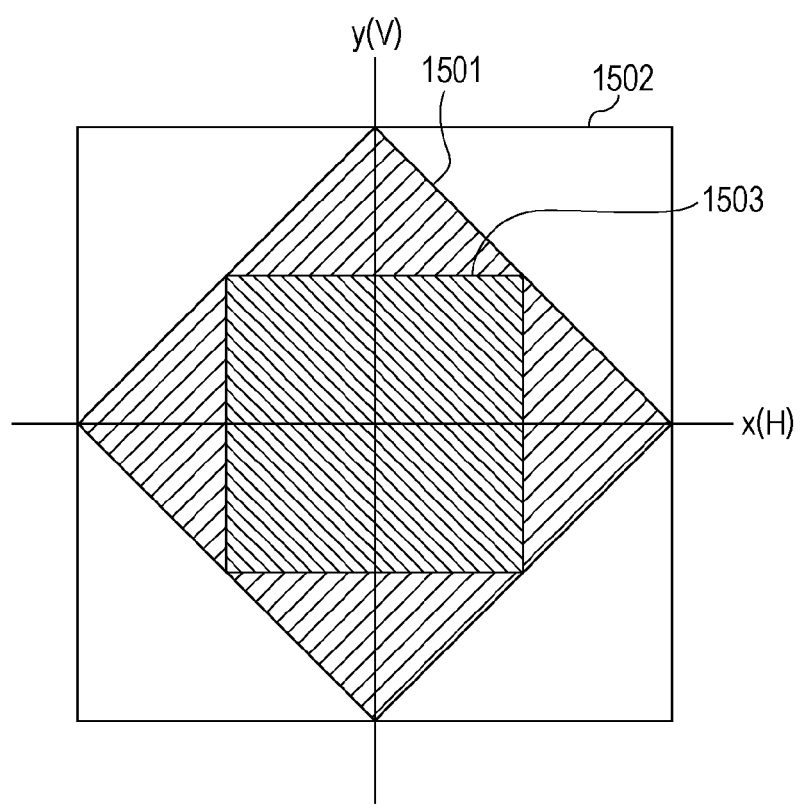
FIG. 13 is a diagram illustrating a primary-color Bayer arrangement of an image pickup element.
FIG. 14 is a diagram illustrating characteristics of a spatial frequency in which first and second luminance signals can be resolved.

FIG. 12 is a diagram illustrating part of configuration of another image processing circuit 105. In FIG. 12, circuits having configurations the same as those of the circuits shown in FIG. 2 are denoted by reference numerals the same as those shown in FIG. 2. The image processing circuit 105 of this embodiment includes a white balance circuit 201, a luminance/color generation circuit 202, and a frequency band processing circuit 1203.

A luminance signal Yp and color difference signals Up and Vp which are output from the luminance/color generation circuit 202 and in which aliasing signals are suppressed are first supplied to an LPF 1211 and a high-pass filter (HPF) 1212 included in the frequency band processing circuit 1203.

As with the reducing circuit 210 shown in FIG. 2, the LPF 1211 performs V-LPF processing and H-LPF processing on the luminance signal Yp and the color difference signals Up and Vp so as to generate a luminance signal $Y_{low1}$ and color difference signals $U_{low1}$ and $V_{low1}$. The V-LPF processing and the H-LPF processing are performed using a filter coefficient represented by [1, 2, 1], for example.

The HPF 1212 subtracts the luminance signal $Y_{low1}$ and the color difference signals $U_{low1}$ and $V_{low1}$ generated by the LPF 1211 from the luminance signal Yp and the color difference signals Up and Vp. As a result, the HPF 1212 extracts a luminance signal $Y_{high1}$ and color difference signals $U_{high1}$ and $V_{high1}$ which are high-frequency components of the luminance signal Yp and the color difference signals Up and Vp, respectively.

The luminance signal $Y_{high1}$ and the color difference signals $U_{high1}$ and $V_{high1}$ are supplied to a noise suppression circuit 1213 which performs noise suppression processing in a method similar to that employed in the noise suppression circuit 208 shown in FIG. 2. Furthermore, the luminance signal $Y_{high1}$ and the color difference signals $U_{high1}$ and $V_{high1}$ are supplied to a synthesis ratio calculation circuit 1214 where a synthesis ratio is calculated in a method similar to that employed in the synthesis-ratio calculation circuit 209 shown in FIG. 2.

The luminance signal luminance signal $Y_{low1}$ and the color difference signals $U_{low1}$ and $V_{low1}$ generated by the LPF 1211 are supplied to a downsampling (DS) circuit 1215. The DS circuit 1215 performs downsampling processing on the luminance signal $Y_{low1}$ and the color difference signals $U_{low1}$ and $V_{low1}$ so that the number of pixels is reduced by half in horizontal and vertical directions so as to generate a luminance signal $Yp_2$ and color difference signals $Up_2$ and $Vp_2$.

The luminance signal $Yp_2$ and the color difference signals $Up_2$ and $Vp_2$ output from the DS circuit 1215 are supplied to an LPF 1216 and an HPF 1217.

As with the reducing circuit 210 shown in FIG. 2, the LPF 1216 performs V-LPF processing and H-LPF processing on the luminance signal $Yp_2$ and the color difference signals $Up_2$ and $Vp_2$ so as to generate luminance signal $Y_{low2}$ and color difference signals $U_{low2}$ and $V_{low2}$.

The HPF 1217 subtracts the luminance signal $Y_{low2}$ and the color difference signals $U_{low2}$ and $V_{low2}$ generated by the LPF 1216 from the luminance signal $Yp_2$ and the color difference signals $Up_2$ and $Vp_2$ output from the DS circuit 1215. As a result, the HPF 1217 extracts a luminance signal $Y_{high2}$ and color difference signals $U_{high2}$ and $V_{high2}$ which are high-frequency components of the luminance signal $Yp_2$ and the color difference signals $Up_2$ and $Vp_2$.

The luminance signal $Y_{high2}$ and the color difference signals $U_{high2}$ and $V_{high2}$ are supplied to a noise suppression circuit 1218 which performs noise suppression processing in a method similar to that employed in the noise suppression circuit 208 shown in FIG. 2. Furthermore, the luminance signal $Y_{high2}$ and the color difference signals $U_{high2}$ and $V_{high2}$ are supplied to a synthesis ration calculation circuit 1219 where a synthesis ratio is calculated in a method similar to that employed in the synthesis-ratio calculation circuit 209 shown in FIG. 2.

The luminance signal $Y_{low2}$ and the color difference signals $U_{low2}$ and $V_{low2}$ generated by the LPF 1216 are supplied to a DS circuit 1220. The DS circuit 1220 performs downsampling processing on the luminance signal $Y_{low2}$ and the color difference signals $U_{low2}$ and $V_{low2}$ so that the number of pixels is reduced by half in the horizontal and vertical directions so as to generate a luminance signal $Yp_3$ and color difference signals $Up_3$ and $Vp_3$.

The luminance signal $Yp_3$ and the color difference signals $Up_3$ and $Vp_3$ output from the DS circuit 1220 are supplied to an LPF 1221 and an HPF 1222.

As with the reducing circuit 210 shown in FIG. 2, the LPF 1221 performs V-LPF processing and H-LPF processing on the luminance signal $Yp_3$ and the color difference signals $Up_3$ and $Vp_3$ so as to generate luminance signal $Y_{low3}$ and color difference signals $U_{low3}$ and $V_{low3}$.

The HPF 1222 subtracts the luminance signal $Y_{low3}$ and the color difference signals $U_{low3}$ and $V_{low3}$ generated by the LPF 1221 from the luminance signal $Yp_3$ and the color difference signals $Up_3$ and $Vp_3$ output from the DS circuit 1220. As a result, the HPF 1222 extracts a luminance signal $Y_{high3}$ and color difference signals $U_{high3}$ and $V_{high3}$ which are high-frequency components of the luminance signal $Yp_3$ and the color difference signals $Up_3$ and $Vp_3$.

The luminance signal $Y_{high3}$ and the color difference signals $U_{high3}$ and $V_{high3}$ are supplied to a noise suppression circuit 1223 which performs noise suppression processing in a method similar to that employed in the noise suppression circuit 208 shown in FIG. 2. Furthermore, the luminance signal $Y_{high3}$ and the color difference signals $U_{high3}$ and $V_{high3}$ are supplied to a synthesis ration calculation circuit 1224 where a synthesis ratio is calculated in a method similar to that employed in the synthesis-ratio calculation circuit 209 shown in FIG. 2.

The luminance signal $Y_{low3}$ and the color difference signals $U_{low3}$ and $V_{low3}$ generated by the LPF 1221 are supplied to a DS circuit 1225. The DS circuit 1225 performs downsampling processing on the luminance signal $Y_{low3}$ and the color difference signals $U_{low3}$ and $V_{low3}$ so that the number of pixels is reduced by half in the horizontal and vertical directions so as to generate a luminance signal $Yp_4$ and color difference signals $Up_4$ and $Vp_4$.

The luminance signal $Yp_4$ and the color difference signals $Up_4$ and $Vp_4$ are supplied to a noise suppression circuit 1226 which performs noise suppression processing in a method similar to that employed in the noise suppression circuit 208 shown in FIG. 2.

Frequency bands of the luminance signals $Y_{high1}$, $Y_{high2}$, $Y_{high3}$, and $Yp_4$ do not overlap with one another, and the frequency band of the luminance signal $Y_{high1}$ is the highest and followed by the frequency bands of the luminance signals $Y_{high2}$, $Y_{high3}$, and $Yp_4$ in this order. The same is applied to the color difference signals $U_{high1}$ to $Up_4$ and $V_{high1}$ to $Vp_4$.

An enlargement circuit 1227 performs upsampling processing on the signals output from the noise suppression circuit 1226 so that the number of pixels of the signals output from the noise suppression circuit 1226 becomes equal to the number of pixels of the signals output from the noise suppression circuit 1223. An image synthesis circuit 1228 synthesizes the signals output from the enlargement circuit 1227 and the signals output from the noise suppression circuit 1223 in a method similar to that employed in the image synthesis circuit 213 shown in FIG. 2 using the synthesis ratio obtained by the synthesis ratio calculation circuit 1224.

An enlargement circuit 1229 performs upsampling processing on the signals output from the image synthesis circuit 1228 so that the number of pixels of the signals output from the image synthesis circuit 1228 becomes equal to the number of pixels of the signals output from the noise suppression circuit 1218. The image synthesis circuit 1230 synthesizes the signals output from the enlargement circuit 1229 with the signals output from the noise suppression circuit 1218 using the synthesis ratio obtained by the synthesis ratio calculation circuit 1219 in a method similar to that employed in the image synthesis circuit 213 shown in FIG. 2.

Furthermore, an enlargement circuit 1231 performs upsampling processing on signals output from the image synthesis circuit 1230 so that the number of pixels of the signals output from the image synthesis circuit 1230 becomes equal to the number of pixels of the signals output from the noise suppression circuit 1213. An image synthesis circuit 1232 synthesizes the signals output from the enlargement circuit 1231 with the signals output from the noise suppression circuit 1213 in a method similar to that employed in the image synthesis circuit 213 shown in FIG. 2 using the synthesis ratio obtained by the synthesis ratio calculation circuit 1214.

As described above, since an image signal in which an aliasing signal is suppressed in advance is divided into image signals of a plurality of frequency bands, even when the image signals of the plurality of frequency bands are synthesized with one another, generation of the aliasing signal can be controlled.

As described above, in the foregoing embodiments, among image signals of a plurality of frequency bands which are to be synthesized with one another, an image signal of the highest frequency band includes a luminance signal generated by a luminance mixing circuit. With this configuration, since generation of an aliasing signal of an image signal of the highest frequency band is suppressed, even when the image signal is synthesized with an image signal of a lower frequency band, influence of the aliasing signal is merely increased.

Note that, in the foregoing embodiments, a low frequency layer image signal is generated by performing reduction on an original image signal. However, a low frequency layer image signal may be generated by performing LPF processing on the original signal without performing the reduction on the image signal.

Note that, in the present invention, a position where the luminance mixing circuit is disposed is not limited to the foregoing embodiments as long as an image signal of the highest frequency band among image signals of a plurality of frequency bands which are to be synthesized with one another includes a luminance signal generated by the luminance mixing circuit.

Other Embodiments

Furthermore, the present invention may be realized by executing the following processing. That is, software (a program) which realizes the functions of the foregoing embodiments may be supplied to a system or an apparatus through a network or various storage media, and a computer (or a CPU, an MPU, or the like) of the system or the apparatus may reads and executes the program.

As described above, according to the present invention, generation of aliasing signals can be suppressed while a process of suppressing noise by dividing an image signal into a plurality of frequency bands is executed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/070384, filed Dec. 4, 2009, which is hereby incorporated by reference herein in its entirety.

REFERENCE SIGNS LIST

201 WHITE BALANCE CIRCUIT
202 LUMINANCE/COLOR GENERATION CIRCUIT
203, 1003, 1203 FREQUENCY BAND PROCESSING CIRCUIT
204 FIRST LUMINANCE SIGNAL GENERATION CIRCUIT
205 SECOND LUMINANCE SIGNAL GENERATION CIRCUIT
206 LUMINANCE MIXING CIRCUIT
207 COLOR GENERATION CIRCUIT
208, 211, 1213, 1218, 1223, 1226 NOISE SUPPRESSION CIRCUIT
209, 1214, 1219, 1224 SYNTHESIS-RATIO CALCULATION CIRCUIT
210, 1010 REDUCING CIRCUIT
212, 1227, 1229, 1231 ENLARGEMENT CIRCUIT
213, 1228, 1230, 1232 IMAGE SYNTHESIS CIRCUIT
1211, 1216, 1221 LOW-PASS FILTER (LPF)
1212, 1217, 1222 HIGH-PASS FILTER (HPF)
1215, 1220, 1225 DOWNSAMPLING (DS) CIRCUIT

What is claimed is:

1. An apparatus comprising:
a generating unit configured to receive an image signal and generate a plurality of image signals in different frequency bands from the image signal;
a synthesizing unit configured to synthesize the generated plurality of image signals with one another;
a first signal generating unit configured to receive an image signal including a plurality of color signals including a first color signal and generate a first signal using image signals obtained by compensating for pixels which do not correspond to the first color signal;
a second signal generating unit configured to receive an image signal including a plurality of color signals including the first color signal and generate a second signal using the plurality of color signals; and
a mixing unit configured to receive an image signal including a plurality of color signals including the first color signal from the generating unit, determine a mixing ratio between the first and second signals based on the saturation of each pixel of the image signal, and generate a third signal by synthesizing the first and second signals with each other using the mixing ratio,
wherein an image signal, among the plurality of image signals, which has a highest frequency band includes the third signal.

2. The apparatus according to claim 1, wherein the generating unit receives an image signal including the third signal.

3. The apparatus according to claim 1, wherein the first signal generating unit and the second signal generating unit receive an image signal of the highest frequency band among the plurality of image signals.

4. The apparatus according to claim 1, wherein the generating unit generates an image signal of a frequency band lower than a frequency band of an input image signal.

5. The apparatus according to claim 1, wherein the first signal generating unit and the second signal generating unit receive an image signal including red, green, and blue color signals, generated by a pickup element having a Bayer arrangement, and the first color signal corresponds to the green color signal.

6. The apparatus according to claim 1, further comprising a suppressing unit configured to perform noise suppression processing on the generated plurality of image signals.

7. A method comprising:
receiving an image signal and generating a plurality of image signals in different frequency bands from the image signal;
synthesizing the generated plurality of image signals with one another;
receiving a signal including a plurality of color signals including a first color signal;
generating a first signal using signals obtained by compensating for pixels which do not correspond to the first color signal;
receiving a signal including a plurality of color signals including the first color signal;
generating a second signal using the plurality of color signals;
determining a mixing ratio between the first and second signals based on the saturation of each pixel of the image signal; and
generating a third signal by mixing the first and second signals with each other using the mixing ratio,
wherein an image signal, among the plurality of image signals, which has a highest frequency band includes the third signal.

8. The method according to claim 7, further comprising receiving an image signal including the third signal.

9. The method according to claim 7, wherein generating the first and second signals includes inputting an image signal of the highest frequency band among the generated plurality of image signals.

10. The method according to claim 7, further comprising generating an image signal of a frequency band lower than a frequency band of an input image signal.

11. The method according to claim 7, further comprising receiving an image signal including red, green, and blue color signals, generated by a pickup element having a Bayer arrangement, wherein the first color signal corresponds to the green color signal.

12. The method according to claim 7, further comprising performing noise suppression processing on the generated plurality of image signals.

13. A non-transitory storage medium which stores a program used to cause a computer to execute the method according to claim 7.

14. The non-transitory storage medium according to claim 13, further comprising receiving an image signal including the third signal.

15. The non-transitory storage medium according to claim 13, wherein generating the first and second signals includes inputting an image signal of the highest frequency band among the generated plurality of image signals.

16. The non-transitory storage medium according to claim 13, further comprising generating an image signal of a frequency band lower than a frequency band of an input image signal.

17. The non-transitory storage medium according to claim 13, further comprising receiving an image signal including red, green, and blue color signals, generated by a pickup element having a Bayer arrangement, wherein the first color signal corresponds to the green color signal.

18. The non-transitory storage medium according to claim 13, further comprising performing noise suppression processing on the generated plurality of image signals.

* * * * *